(12) United States Patent
Haishima

(10) Patent No.: US 11,823,181 B2
(45) Date of Patent: Nov. 21, 2023

(54) CURRENCY HANDLING SYSTEM

(71) Applicant: Universal Entertainment Corporation, Tokyo (JP)

(72) Inventor: Jun Haishima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 42 days.

(21) Appl. No.: 17/428,187

(22) PCT Filed: Jan. 30, 2020

(86) PCT No.: PCT/JP2020/003373
§ 371 (c)(1),
(2) Date: Aug. 3, 2021

(87) PCT Pub. No.: WO2020/162305
PCT Pub. Date: Aug. 13, 2020

(65) Prior Publication Data
US 2022/0122063 A1 Apr. 21, 2022

(30) Foreign Application Priority Data
Feb. 4, 2019 (JP) ................................ 2019-018021

(51) Int. Cl.
*G06Q 20/38* (2012.01)
*G07D 11/22* (2019.01)
(Continued)

(52) U.S. Cl.
CPC ......... *G06Q 20/381* (2013.01); *G06Q 20/085* (2013.01); *G07D 11/22* (2019.01);
(Continued)

(58) Field of Classification Search
CPC .... G06Q 20/381; G06Q 20/085; G07D 11/22; G07D 7/12; G07D 2207/00; G07D 2211/00; G07F 17/3244
See application file for complete search history.

(56) References Cited

U.S. PATENT DOCUMENTS

2004/0026497 A1* 2/2004 Ho ........................... G07D 7/12
235/379
2005/0154674 A1* 7/2005 Nicholls ................ G06Q 40/04
705/43

(Continued)

FOREIGN PATENT DOCUMENTS

JP 2013-127805 6/2013

OTHER PUBLICATIONS

Asif Iqbal et al., Implementation of a Low Cost Hybrid Automated Teller Machine (H-ATM) with Integrated Currency Exchange Capability, Mar. 7, 2013, IEEE, pp. 929-932 (Year: 2013).*
Rogerio de Lemos et al., Immune-Inspired Adaptable Error Detection for Automated Teller Machines, Aug. 20, 2007, IEEE, pp. 873-886 (Year: 2007).*

*Primary Examiner* — Nilesh B Khatri
(74) *Attorney, Agent, or Firm* — Simpson & Simpson, PLLC; S. Peter Konzel

(57) ABSTRACT

An object of the present invention is to provide a currency handling system which makes it possible to decrease a risk of dealing with foreign currency at the time of the occurrence of a communication error in a case in which a currency reading device capable of accepting a variety of currencies including a foreign currency is used while the currency handling system is connected to a management server through a communication line. A currency handling system 100 is connected to a casino management system 2 through a network 3, and includes a currency reading device 201 which is capable of accepting a variety of currencies and a PTS terminal 700. The PTS terminal 700 causes a process which limits usage of a foreign currency but allows usage of (Continued)

a local currency in the currency reading device 201 to be performed in a case (offline state) in which an error occurs in communication with the casino management system 2.

6 Claims, 12 Drawing Sheets

(51) Int. Cl.
*G06Q 20/08* (2012.01)
*G07D 7/02* (2016.01)
*G07F 17/32* (2006.01)

(52) U.S. Cl.
CPC ........... *G07D 7/02* (2013.01); *G07D 2207/00* (2013.01); *G07D 2211/00* (2013.01); *G07F 17/3244* (2013.01)

(56) References Cited

U.S. PATENT DOCUMENTS

| | | | |
|---|---|---|---|
| 2010/0250418 A1* | 9/2010 | Schrick | G06Q 40/00 705/35 |
| 2011/0124405 A1* | 5/2011 | Okada | G07D 7/12 463/43 |
| 2014/0149286 A1* | 5/2014 | Forsyth | G07F 19/20 705/43 |
| 2015/0038217 A1 | 2/2015 | Okada | |
| 2015/0046325 A1* | 2/2015 | McCracken | G06F 9/452 705/43 |
| 2021/0049853 A1* | 2/2021 | Baranowski | B65H 29/34 |

* cited by examiner

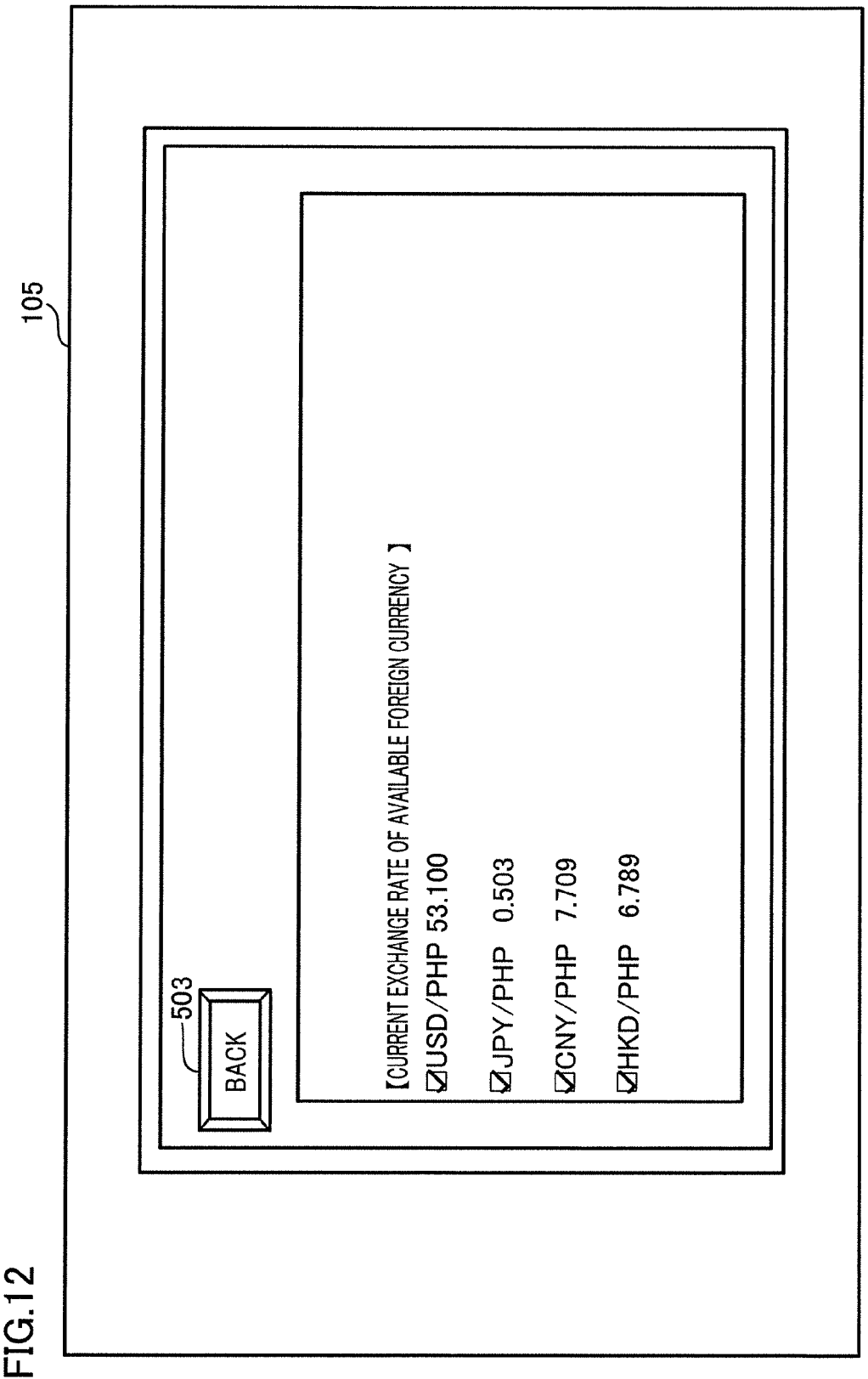

CURRENCY HANDLING SYSTEM

TECHNICAL FIELD

The present invention relates to a currency handling system.

BACKGROUND

A known currency reading device (Bill Validator) provided at a gaming machine receives only currency of the country or region in which the gaming machine is provided, and is able to distinguish the face value (see Patent Literatures 1 to 2).

However, with increase of travelers and sojourners from foreign countries, gaming machines are increasingly required to accept foreign currencies. As such, gaming machines are required to accept foreign currencies.

CITATION LIST

Patent Literatures

[PTL 1] Japanese Unexamined Patent Publication No. 2013-127805
[PTL 2] Japanese Unexamined Patent Publication No. 2012-141897

SUMMARY OF INVENTION

Technical Problem

In gaming machines accepting a variety of foreign currencies, it is sometimes required to replace (exchange and calculate) a foreign currency into a local currency (currency which is used at a country or region; at the country or region, gaming machines are provided) in order to perform payout calculation or in order to calculate the sum (total sales) of the used monetary amount. When each of foreign currencies is replaced into a local currency, replacement is performed based on an exchange rate corresponding to each foreign currency.

The exchange rate corresponding to each foreign currency is updated at a variety of timing. When the gaming machines accept a variety of foreign currencies, an exchange rate which moves in real time can be adopted.

In such cases, when a communication error (offline state) occurs between a server and gaming machines by any reason, a current accurate exchange rate is ungraspable in the gaming machines including currency reading devices in each of which a variety of foreign currencies are available, with the result that a disadvantage can be given to a player or an owner of the gaming machines due to a variation of the exchange rate in the offline state. The server manages the exchange rate.

An object of the present invention is to provide a currency handling system which makes it possible to solve the above-described problems.

Solution to Problem

The present invention is a currency handling system connected to a management server through a communication line, including:
a currency reading device which is capable of accepting a variety of currencies; and
a controller which is programmed to perform a predetermined process, and
in a case in which an error occurs in communication with the management server, the controller is programmed to perform a process which limits usage of a foreign currency but allows usage of a local currency in the currency reading device.

By the above-described structure, when a communication error occurs between the currency handling system and the management server, a process which limits usage of a foreign currency but allows usage of a local currency is performed in the currency reading device. Because of this, when the offline state occurs so that the management server is unable to manage and monitor a foreign currency, the usage of a local currency is not limited while the usage of a foreign currency is limited. As a result, a risk of dealing with a foreign currency at the time of the occurrence of a communication error is decreasable.

The present invention is the currency handling system described above, further including:
a storage unit which stores an exchange rate; and
a display device which displays the exchange rate, and
the controller is programmed to perform processes of:
(a) updating the exchange rate in the storage unit in a case in which communication related to information of the exchange rate is performed with the management server;
(b) referring to the exchange rate in the storage unit and displaying the exchange rate on the display unit; and
(c) limiting display of the exchange rate on the display unit in a case in which an error occurs in communication with the management server.

By the above-described structure, when information of the exchange rate is not acquirable because of a communication error between the currency handling system and the management server, a process which limits the display of the exchange rate on the display unit is performed. Because of this, when the offline state occurs so that a foreign currency is unable to be managed and monitored in the management server, it is possible to inform that the usage of a foreign currency is limited.

The present invention is the currency handling system described above, wherein, in a case in which an error occurs in communication with the management server and then the error is recovered, the controller communicates with the management server in regard to information of the exchange rate and causes the management server to execute a process of updating the exchange rate in the storage unit.

By the above-described structure, when a communication error occurs between the currency handling system and the management server and then the error is recovered, the exchange rate in the storage unit is updated. Because of this, when the offline state is recovered, the exchange rate necessary for using a foreign currency is immediately updated. As a result, it is possible to immediately inform that the limit of the usage of a foreign currency is removed. In the offline state, the exchange rate of a foreign currency is unable to be managed and monitored in the management server.

The present invention is the currency handling system described above, wherein, the controller is programmed to perform a process of:
limiting usage of a predetermined money type of a predetermined foreign currency in the currency reading device in a case in which an error occurs in communication with the management server.

By the above-described structure, in a case in which a communication error occurs between the currency handling system and the management server, a process which limits usage of a predetermined money type of a predetermined foreign currency but allows usage of a local currency is performed in the currency reading device. Because of this, when the offline state occurs, the usage of a foreign currency except the predetermined money type of the predetermined foreign currency and the usage of a local currency are not limited while the usage of the predetermined money type of the predetermined foreign currency is limited. As a result, a risk of dealing with a foreign currency at the time of the occurrence of the communication error is decreasable. In the offline state, a foreign currency is unable to be managed and monitored in the management server.

BRIEF DESCRIPTION OF DRAWINGS

FIG. 12 is an explanatory diagram of an exchange rate screen.

PREFERRED EMBODIMENT OF INVENTION

Embodiment

A casino system will be described with reference to figures. The casino system manages slot machines 4S each of which includes a currency handling system 100 (currency reading device 201 and PTS terminal 700) of the present embodiment.

(Casino System)

Figure 1:
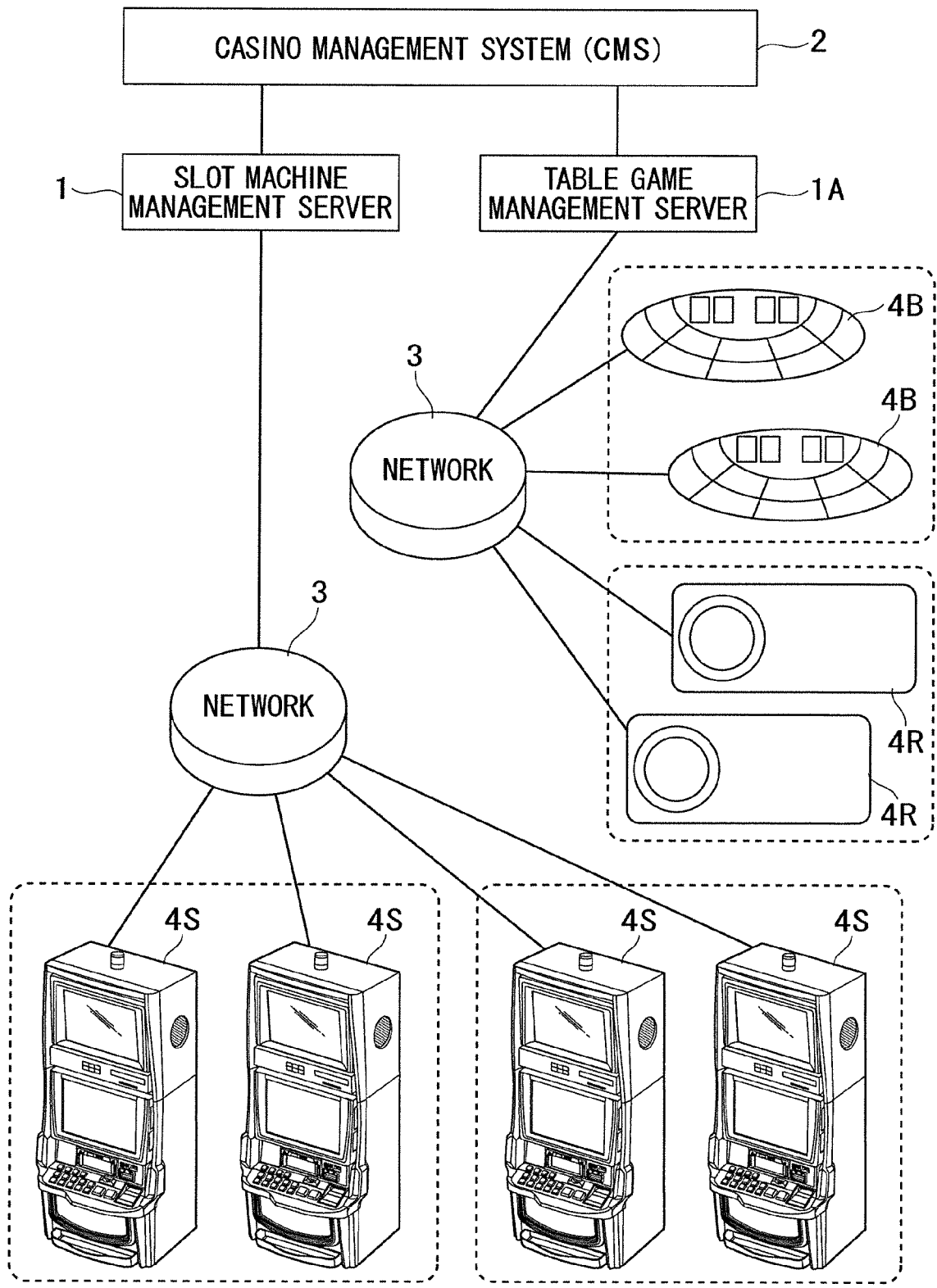
FIG. 1 illustrates a network environment of a casino system.

As shown in FIG. 1, a slot machine management server 1 is connected with slot machines 4S (gaming machines 4) through a network 3 (communication lines). In other words, the slot machine management server 1 mainly plays a role of managing the slot machines 4S. The slot machine management server 1 itself is connected with a casino management system 2 (CMS) which manages operation of the entire casino. With the casino management system 2, a table game management server 1A is also connected. The table game management server 1A plays a role of managing table games (total sales, etc.) such as baccarat game tables 4B, roulette game machines 4R, and poker game machines 4P, which correspond to other gaming machines 4. In this regard, the casino management system 2 itself may be connected with the outside through communication lines (the Internet, etc.).

The gaming machine 4 includes a device which is able to perform or support a game (e.g., support of progress of a game and support of calculation of a payout). In the game, a payout may be awarded based on a betted gaming value and a game result. The gaming machine 4 further includes a device which is embedded in or provided to be adjacent to a playing table of baccarat or porker, which is a game controlled by a human player. In this regard, the gaming value is electrically valuable information in which a currency amount is exchanged into electronic money, etc. The gaming value in the disclosure is not limited to this, and for example a gaming medium such as a medal, a token, a coin, or a ticket or the like may be used. The ticket is not particularly limited, and for example, a barcoded ticket may be used. The barcoded ticket has data of, e.g., a credit amount in the form of bar code. Alternatively, the gaming value may be a game point which does not include valuable information.

Figure 2:
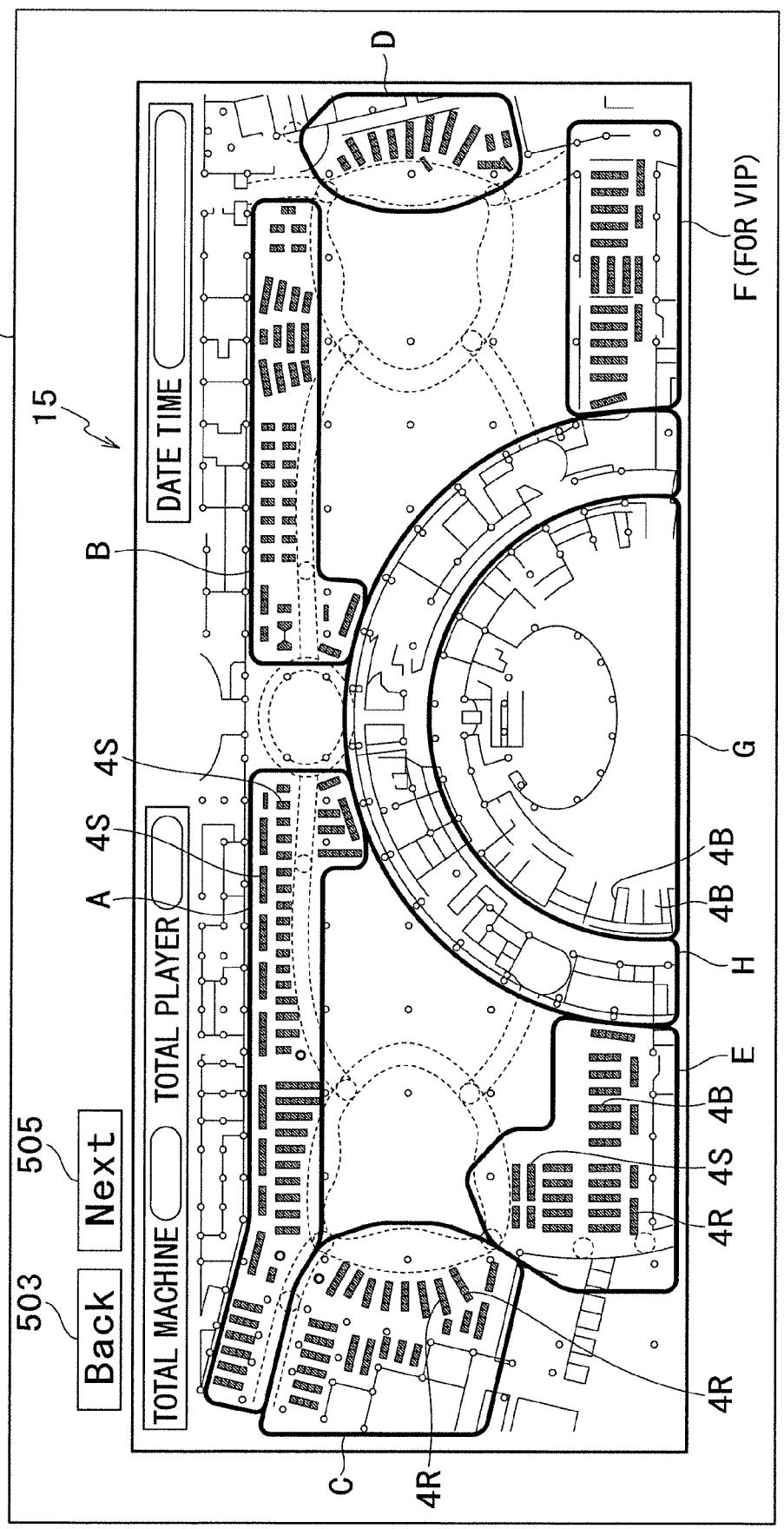
FIG. 2 illustrates areas A to H which are associated with gaming machines provided at a gaming facility.

As shown in FIG. 2, the gaming machines 4 such as the slot machines 4S, baccarat game tables 4B, roulette game machines 4R, and poker game machines 4P are provided at a gaming facility 15. In addition to that, the slot machines 4S managed by the slot machine management server 1 are associated with any of areas A to H in the gaming facility 15.

For example, the area A is provided with slot machines 4S which are of a type Y, in which the minimum bet (the minimum bet amount to start a game) is set to be lower than the minimum bet in the area B. The area B is provided with the slot machines 4S which are of the type Y, in which the minimum bet is set to be higher than the minimum bet in the area A. The area C is provided with slot machines 4S which are of a type Z, in which the minimum bet is set to be lower than the minimum bet in the area D. The area D is provided with the slot machines 4S which are of the type Z, in which the minimum bet is set to be higher than the minimum bet in the area C. The area E is provided with slot machines 4S, in which the minimum bet is set to be the highest among the minimum bets among the gaming facility 15. The area F is provided with slot machines 4S which are used exclusively for VIP members. The area G is provided with slot machines 4S which are of a type X, in which the minimum bet is set to be higher than the minimum bet in the area H. The area H is provided with the slot machines 4S which are of the type X, in which the minimum bet is set to be lower than the minimum bet in the area G.

In this regard, it is possible to arrange areas of each gaming facility at will, e.g., which slot machine 4S is associated with each area and for what reason each area is provided. For example, areas may correspond to respective types of games or manufacturers, areas may be classified based on values of minimum bets or based on available currencies, or one area may be associated with one slot machine 4S.

(Structure of Slot Machine Management Server 1)

Figure 4:
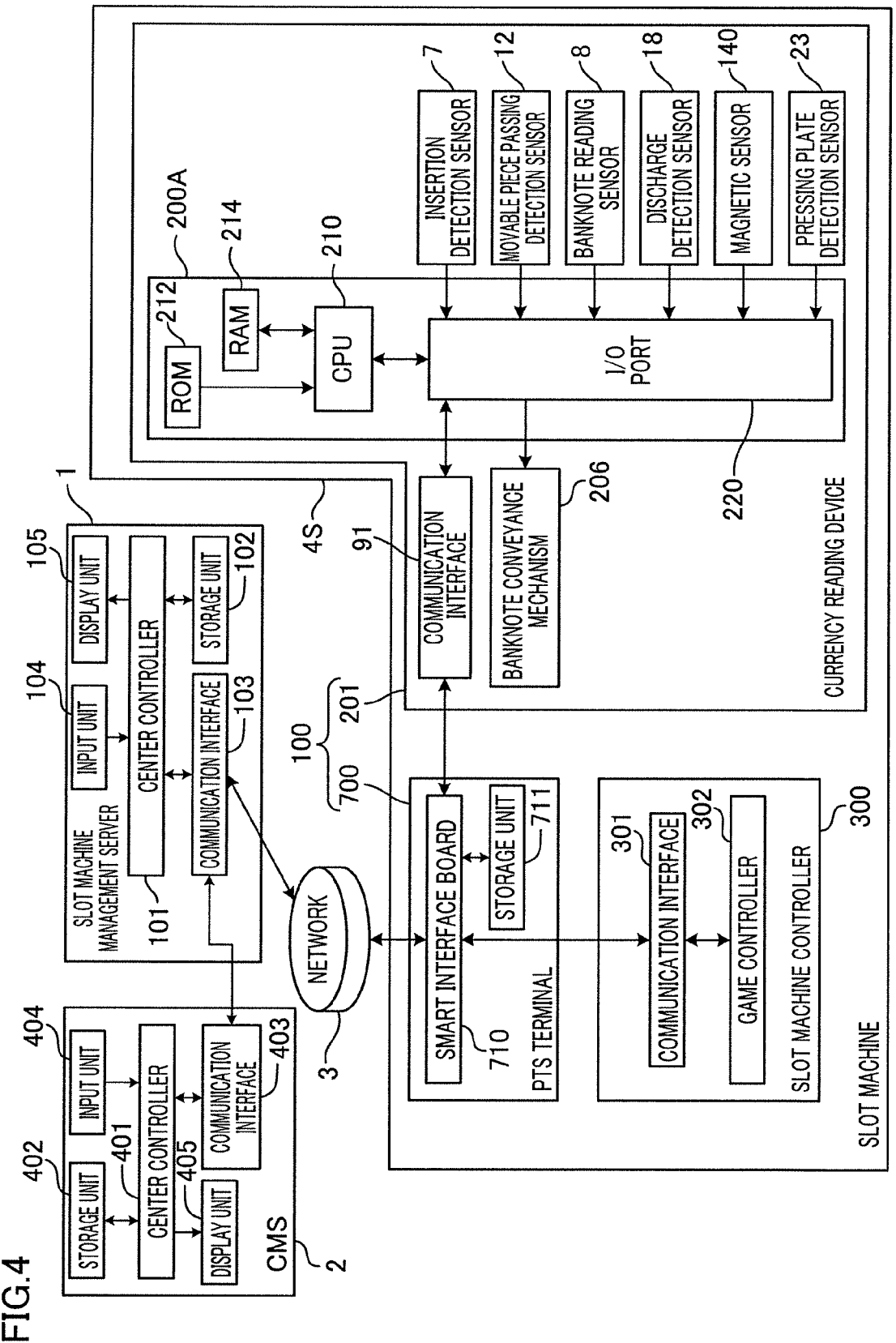
FIG. 4 is a block diagram of the casino management system including a currency handling system.

As shown in FIG. 4, the slot machine management server 1 is a computer. The slot machine management server 1 includes a center controller 101, a storage unit 102 which stores information, etc., a communication interface 103 for achieving sending and receiving of a signal (command) to and from the outside, an input unit 104 (touch panel, keyboard, and mouse, etc.) which makes it possible to input information, etc., and a display unit 105 which is able to display characters and images, etc. In this regard, information is sent from the slot machine 4S (PTS terminal 700, etc.) or the casino management system 2, or is input from the input unit. Although not illustrated, the center controller 101 includes a CPU, a ROM, a RAM, and an I/O port to which members such as the storage unit 102, the communication interface 103 (transmitter), the input unit 104, and the display unit 105 are connected.

(Structure of Casino Management System 2)

As shown in FIG. 4, the casino management system 2 is a computer which manages the operation of the entire casino (including management of the exchange rate, etc.). Similarly to the slot machine management server 1, the casino management system 2 includes a center controller 401, a storage unit 402 which stores information, etc., a communication interface 403 for achieving sending and receiving of a signal (command) to and from the outside, an input unit 404 (touch panel, keyboard, and mouse, etc.) which makes it possible to input information, etc., and a display unit 405 which is able to display characters and images, etc. In this regard, information is sent from the slot machine management server 1 or is input from the input unit.

The center controller 401 of the casino management system 2 plays a role of sending information of the exchange rate which is stored in the storage unit 402 to the currency handling system 100 (PTS terminal 700) in a case in which a banknote T read by the currency reading device 201 is determined as a foreign currency in the PTS terminal 700. In this casino management system 2, the exchange rate referred by the entire casino system is managed. This exchange rate is updated by manual input of a person in charge of the casino management system 2 at a predetermined time (AM 6:00).

(Slot Machine 4S)

In the present embodiment, the slot machine 4S will be described as an example of a gaming machine 4 which is provided with the currency handling system 100 (PTS terminal 700 and currency reading device 201). A device corresponding to the currency handling system 100 is also mounted at each of, e.g., the baccarat game table 4B, the roulette game machine 4R, and the poker game machine 4P which are managed by the table game management server 1A.

Figure 3:
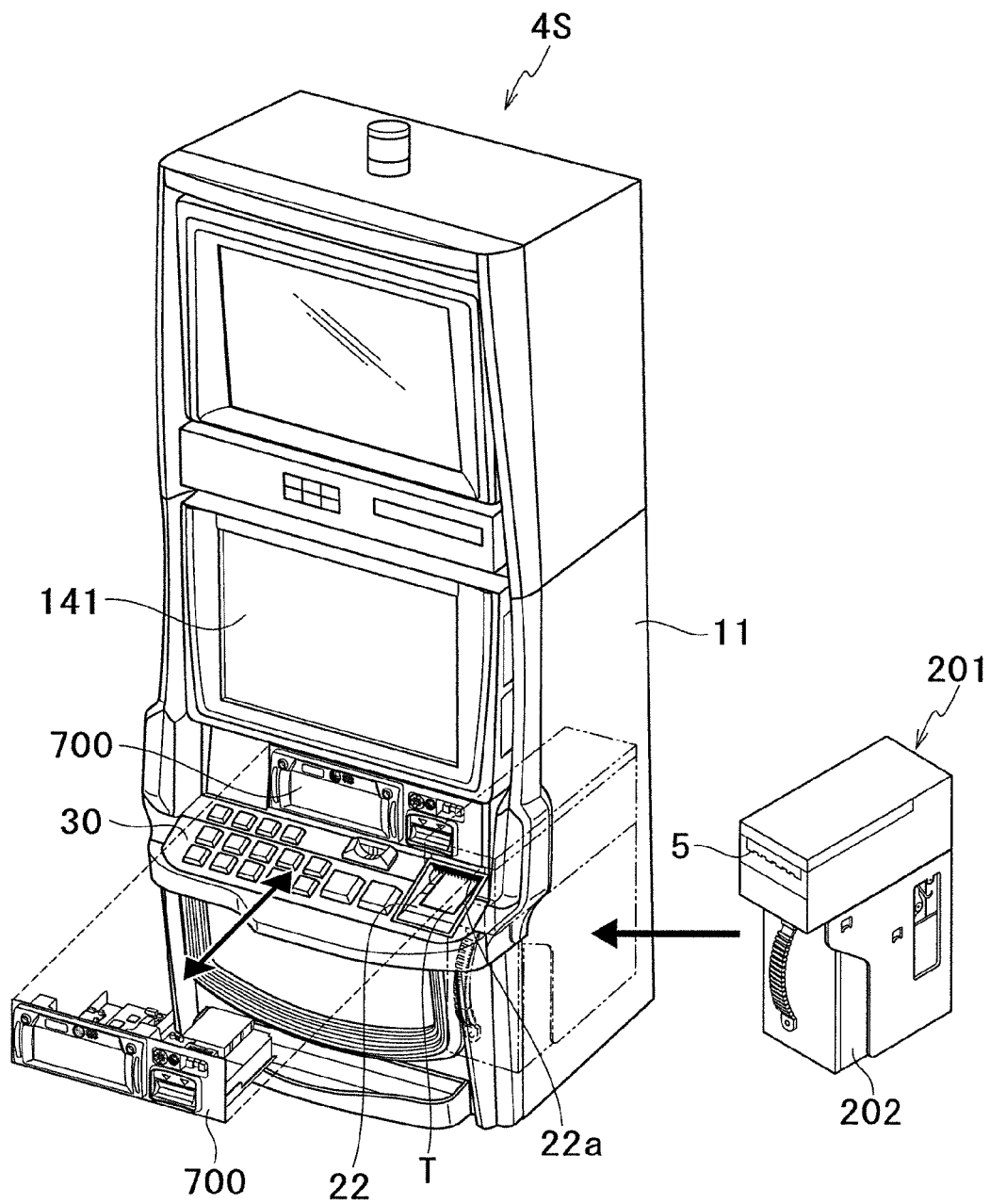
FIG. 3 illustrates a currency reading device and a PTS terminal which are provided at a slot machine.

As shown in FIG. 3, the slot machine 4S includes a cabinet 11. In the cabinet 11, the currency reading device 201, a slot machine controller 300, and the PTS terminal 700 are provided. Outside the cabinet 11, the followings are provided: a game image display panel 141 which displays a game image, etc.; a control panel 30 which is provided with buttons, etc., for operating a game; and a bill entry 22 which includes an insertion slot 22a for receiving a banknote T from the outside. In other words, a banknote T is received into the currency reading device 201 through the insertion slot 22a of the bill entry 22.

(Currency Reading Device 201)

As shown in FIG. 3, the currency reading device 201 is disposed in the cabinet 11 so that a banknote insertion slot 5 is identical to the insertion slot 22a of the bill entry 22. In this way, a banknote T inserted from the insertion slot 22a of the bill entry 22 is introduced into the currency reading device 201. In addition to that, the currency reading device 201 includes a banknote accommodation unit 202 which accommodates the received banknote T. The banknote accommodation unit 202 has a function as a safe, and is detachably attached to the currency reading device 201.

In the currency reading device 201 of the present embodiment, not only a banknote T of PHP (peso) but also banknotes T of plural foreign currencies (USD, US dollar; JPY, Japanese yen; CNY, yuan; HKD, Hong Kong dollar; EUR, euro; MOP, Macanese pataca; AUD, Australian dollar) are available. PHP (peso) is set as a local currency.

As shown in FIG. 4, a banknote conveyance mechanism 206 is provided inside the currency reading device 201. The banknote conveyance mechanism 206 conveys a banknote T which is inserted from the insertion slot 22a of the bill entry 22, to the banknote accommodation unit 202. In addition to that, inside the currency reading device 201, a control circuit board 200A which controls motion of a driving device such as the banknote conveyance mechanism 206 is provided. On this control circuit board 200A, a CPU (Control Processing Unit) 210, a ROM (Read Only Memory) 212, a RAM (Random Access Memory) 214, and an I/O port 220 are mounted.

The CPU 210 receives detection signals, through the I/O port 220, from sensors such as an insertion detection sensor 7, a movable piece passing detection sensor 12, a banknote reading sensor 8, a discharge detection sensor 18, a magnetic sensor 140, and a pressing plate detection sensor 23. The insertion detection sensor 7 detects a banknote T inserted into the banknote insertion slot 5. The movable piece passing detection sensor 12 detects being passed through a predetermined position of the banknote conveyance mechanism 206. The banknote reading sensor 8 reads information of the banknote T which is being conveyed. The discharge detection sensor 18 detects the banknote T being discharged into the banknote accommodation unit 202. The magnetic sensor 140 detects whether banknotes T which are laminated and accustomed in the banknote accommodation unit 202 reach a predetermined number. The pressing plate detection sensor 23 can detect a position of a pressing plate which presses banknotes T in the banknote accommodation unit 202. Based on these detection signals, the drive control of the banknote conveyance mechanism 206, etc., is performed. To the I/O port 220, a communication interface 91 is connected. The communication interface 91 is connected to a smart interface board 710 of the PTS terminal 700 so as to enable data communication with the PTS terminal 700.

The insertion detection sensor 7 generates a detection signal when detecting a banknote T inserted into the banknote insertion slot 5. While the insertion detection sensor 7 is an optical sensor such as a retro-reflective photo sensor, the insertion detection sensor 7 may be constituted by a mechanical sensor.

The movable piece passing detection sensor 12 generates a detection signal when detecting that a distal end of the banknote T has passed through the predetermined position of the banknote conveyance mechanism 206, and is provided upstream of the banknote reading sensor 8. This movable piece passing detection sensor 12 is also constituted by an optical sensor or a mechanical sensor, in the same manner as the insertion detection sensor 7.

The banknote reading sensor 8 reads banknote information of the banknote T conveyed by the banknote conveyance mechanism 206. In this regard, the banknote information which is read by the banknote reading sensor 8 is compared to reference data stored in the ROM 212, and the followings are determined: which country or region a currency belongs to; the money type (amount of the banknote T); and whether the banknote T is valid.

The discharge detection sensor 18 detects that a rear end of the banknote T has passed through and that the banknote T has been discharged into the banknote accommodation unit 202, and is provided immediately upstream of the banknote accommodation unit 202. This discharge detection sensor 18 is also constituted by an optical sensor or a mechanical sensor in the same manner as the insertion detection sensor 7.

In the ROM 212, the following sets of data are stored: programs such as an actuation program of the banknote conveyance mechanism 206 and a verification program regarding the banknote T which is read by the banknote reading sensor 8; and permanent data. The CPU 210 generates a control signal based on the programs stored in the ROM 212, sends and receives signals to and from the banknote conveyance mechanism 206 and the like through the I/O port 220, and performs the drive control of the banknote conveyance mechanism 206 and the like. The ROM 212 further stores, regarding the inserted banknote T, reference data used for determining which country or region a currency belongs to, the money type (amount of the banknote T), and the validity of the banknote T. For example, sets of data obtained from the entire print region of a valid banknote T (e.g., data regarding light and shade and data regarding transmitted light and reflected light when infrared light is applied to a valid banknote T) are stored. The RAM 214 stores data and a program used in operation of the CPU 210.

(Slot Machine Controller 300)

The slot machine controller 300 includes a game controller 302 which controls a process performed by the slot machine 4S, and the communication interface 301 which enables data communication with the PTS terminal 700 (see FIG. 4). Although not illustrated, the game controller 302 includes a CPU, a ROM, a RAM, and an I/O port to which members such as the control panel 30 and the game image display panel 141 are connected. The slot machine controller 300 sends, through the communication interface 301, a game result and game information such as the content of a bet betted on a game to the slot machine management server 1 through the PTS terminal 700 as a game information signal. In this regard, game information based on the game information signal received by the slot machine management server 1 is managed in the slot machine management server 1.

To be more specific, the game controller 302 runs a slot game which awards a payout based on a betted gaming value and a game result. In this slot game, twenty symbols determined randomly are displayed on a symbol display area which is formed of twenty areas forming a matrix with, e.g., five columns and four rows. In addition to that, a payout is awarded based on a displayed symbol combination (game result) and a betted gaming value.

(PTS Terminal 700)

As shown in FIG. 3, the PTS terminal 700 is inserted into the cabinet 11 from the front surface side of the slot machine 4S, and embedded in the slot machine 4S so as to form a part of the front surface of the cabinet 11. The PTS terminal 700 includes an LCD (identical to the display), a touch panel, a human detection camera, a microphone, a speaker, a card insertion slot, the smart interface board 710, and a storage unit 711.

The LCD displays an effect image used for an effect in a game, information when there is a payout as a game result, and a current exchange rate of each foreign currency. The touch panel is provided on the LCD to cause the PTS terminal 700 to function as an input device capable of receiving input from the outside. The human detection camera detects the presence of a player by a camera function. The microphone is used for allowing a player to participate in a game through input of player's voice and for authenticating a player by voice recognition. The speaker performs effects in a game by sound, and outputs various types of notification sound. The card insertion slot has a mechanism which allows an IC card such as a member card of a player of a game to be inserted and removed. The smart interface board 710 connected to the above-described components is a control board configured to control the components, and controls sending and receiving of signals to and from the outside. The storage unit 711 (ROM and RAM) is connected to the smart interface board 710, and makes it possible to store various information such as an exchange rate of each foreign currency.

The PTS terminal 700 is arranged to perform mediation in data communications between devices in the slot machine management server 1, the currency reading device 201, and the slot machine controller 300. Specifically, the currency reading device 201 sends the banknote information of a banknote T, which is received from the bill entry 22, to the PTS terminal 700. The PTS terminal 700 associates the received banknote information with area information showing where the slot machine 4S belongs to, and sends the associated information to the slot machine management server 1 and the casino management system 2 via the slot machine management server 1. As described above, the PTS terminal 700 performs mediation of data communication from the currency reading device 201 to the slot machine management server 1 and data communication from the currency reading device 201 to the slot machine controller 300.

The PTS terminal 700 calculates and exchanges (replaces) a foreign currency received by the currency reading device 201 into a local currency (PHP, peso) based on information of an exchange rate which is obtained from the casino management system 2. The LCD of the PTS terminal 700 makes it possible to display a current exchange rate of a currency of each country. In this regard, the LCD displays the timing of update (changing) of the exchange rate (for example, the LCD displays update time (AM 6:00) of the exchange rate).

The currency reading device 201 and the PTS terminal 700 are provided in the slot machine 4S as described above, and form the currency handling system 100 which is connected with the management server 1 through the network 3.

(Process Related to Settings for Offline-Available Currencies)

The following will describe a process in which an administrator of the slot machine management system 1 sets (sets offline-unavailable money types) money types (banknotes T) which are available in the slot machine 4S (currency reading device 201) even when a communication error (offline) occurs between the slot machine management server 1 or casino management system 2 and each slot machine 4S (PTS terminal 700), with reference to FIG. 5 to FIG. 12. It should be noted that this process may be performed in the casino management system 2.

Figure 11:
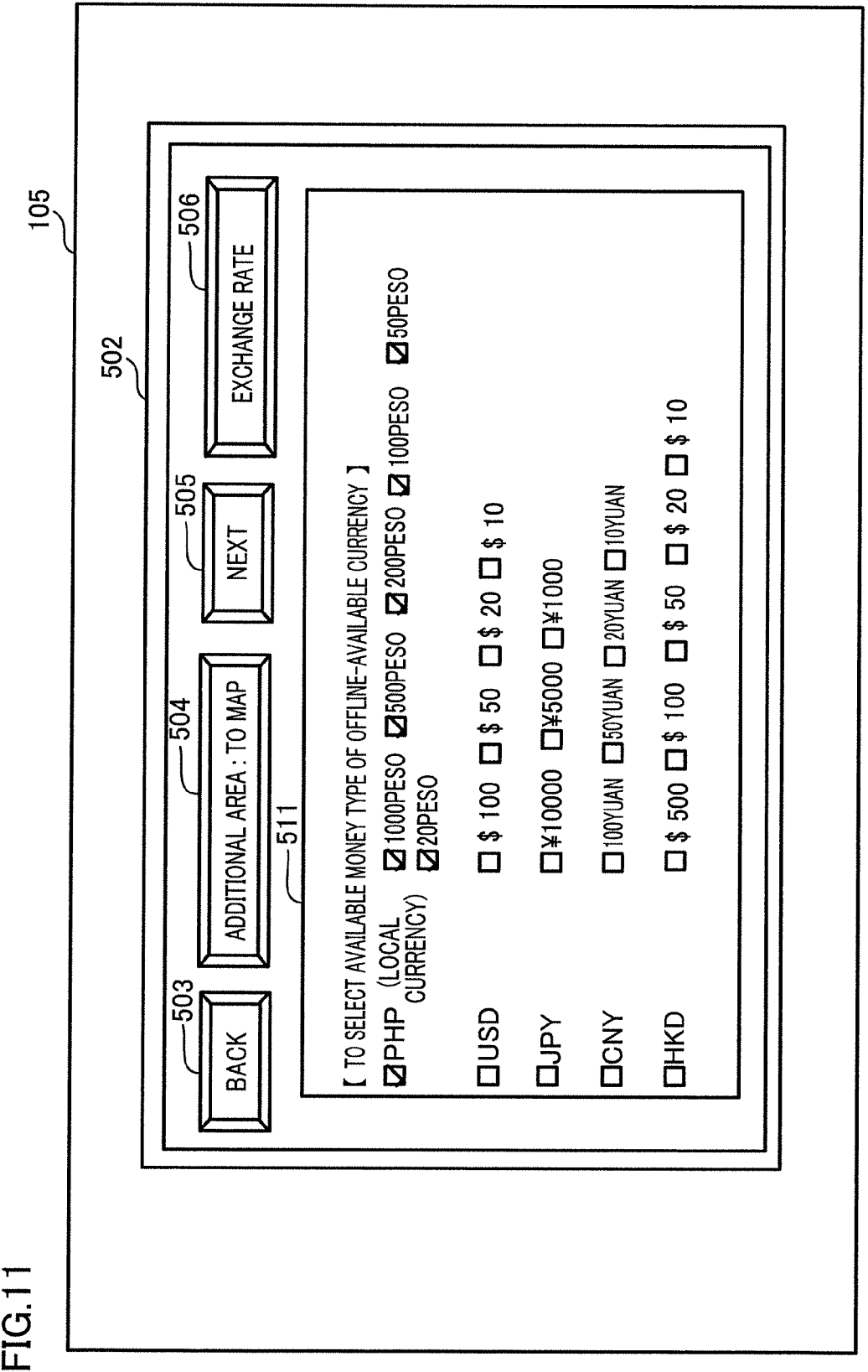
FIG. 11 is an explanatory diagram of an offline-available currency and money type selection screen.

To begin with, the administrator of the slot machine management server 1 performs settings for offline-available currencies by using currency management software from the input unit 104 of the slot machine management server 1. To be more specific, as shown in FIG. 11, the administrator causes the shift to an offline-available money type selection screen 511 displayed on the display unit 105. In the present embodiment, because the latest exchange rate stored in the storage unit 402 of the casino management system 2 is not referable in the offline state (in a state in which a communication error occurs between the slot machine management server 1 or casino management system 2 and the slot machine 4S), a foreign currency is not available in the slot machine 4S in principle (details thereof will be described later). The usage of a foreign currency is limited as such because a disadvantage may be given to a player or an owner of gaming machines due to a variation of the exchange rate in the offline state. However, the disadvantage is not related to a local currency (peso in the present embodiment) which is not affected by the variation of the exchange rate. In addition to that, the administrator may determine that convenience is secured with the minimum disadvantage for a player or an owner of gaming machines due to the variation of the exchange rate, not by limiting usage of all foreign currencies but by limiting usage of only expensive money types in the offline state. Furthermore, even if the management server 1 and the slot machine 4S are in the offline state, the administrator may determine not to limit the usage of a foreign currency, depending on the time when the offline state occurs (e.g., immediately after the update of the exchange rate).

In the present embodiment, the administrator is able to select offline-available money types (banknotes T) related to the money types of a currency which has been selected to be available on an available currency selection screen 508, on the offline-available money type selection screen 511 of FIG. 11 (i.e., offline-unavailable money types related to the money types of currencies which have not been selected to be available on the available currency selection screen 508 are also set). In this regard, a communication error includes a state in which data is unable to be sent or received, a state in which sending data or receiving data is stopped, and a state in which data is intermittently sent or received between the slot machine management server 1 or casino management system 2 and the slot machine 4S (PTS terminal 700 and currency reading device 201, etc.). In other words, a communication error includes all states such as a state in which information of the exchange rate is not accessible and a state in which a foreign currency is not exchangeable into a local currency in the slot machine 4S. Therefore, the communication error also includes a state in which the latest exchange rate is not acquirable because of a communication error between the slot machine management server 1 and the casino management system 2 or outside even if data is able to be sent or received between the slot machine management server 1 and the slot machine 4S.

For example, all banknotes of USD (US dollar), JPY (Japanese yen), CNY (yuan), and HKD (Hong Kong Dollar) which are not selected as shown in FIG. 11 are set to be unavailable, and thus are set to be unavailable in the offline state in each slot machine 4S. Meanwhile, a local currency (PHP, peso) selected by the administrator is set to be available even in the offline state in each slot machine 4S. In the present embodiment, all banknotes of a local currency (PHP, peso) which is not affected by the variation of the exchange rate are selected to be available even in the offline state in each slot machine 4S.

The administrator then selects a Next button 505, and a confirmation screen (not illustrated) is displayed. After confirmation is accepted, the settings for offline-available currencies are completed. In the settings for offline-available currencies, for example, information of areas in which the settings for offline-available currencies are updated, information of currencies which are set to be available or unavailable, and information of money types which are set to be available or unavailable are stored in the storage unit 102 and then sent to slot machines 4S placed at the areas.

The offline-available money type selection screen 511 (see FIG. 11) displays an exchange rate button 506 which causes the shift to an exchange rate screen 510 (see FIG. 12) showing the current exchange rate of each currency. The offline-available money type selection screen 511 also displays a Back button 503 which enables to go back to a prior page.

(Available Currency Management Process)

Figure 5:
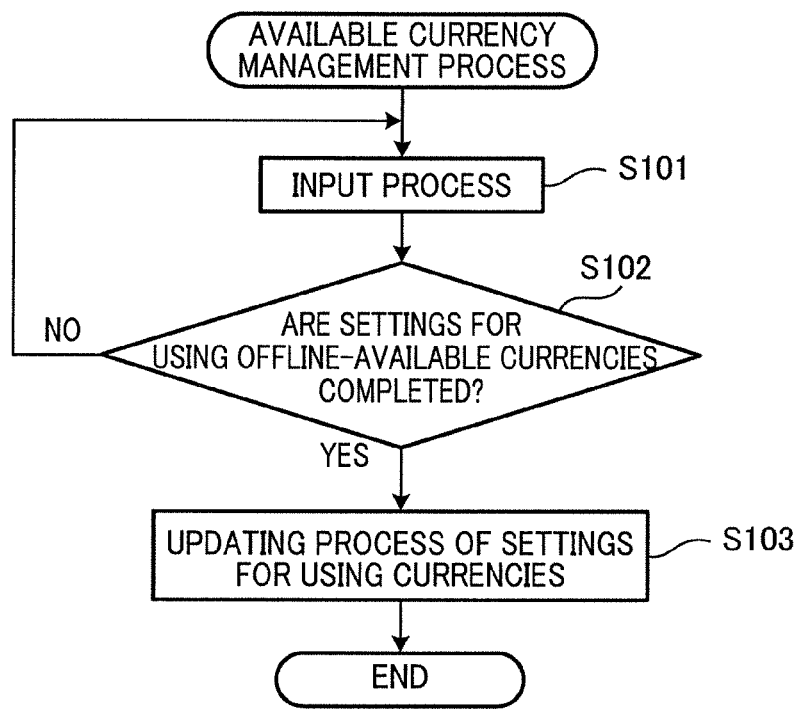
FIG. 5 is a flowchart of an available currency management process.

The following will describe an available currency management process performed in the slot machine management server 1, with reference to a flowchart of FIG. 5.

To begin with, the above-described settings for offline-available currencies are performed by the input unit 104 (S101: input process). Subsequently, the center controller 101 determines whether the settings for offline-available currencies are completed in the input process (S102). If the settings for offline-available currencies have not been completed (NO in S102), completion of the settings for offline-available currencies is waited.

Meanwhile, if the settings for offline-available currencies have been completed (YES in S102), the center controller 101 performs an available currency settings updating process (S103). In this available currency settings updating process, the content of the settings for offline-available currencies which has been input in the step S101 is sent to the PTS terminal 700 of the slot machine 4S, and then updated and stored in the storage unit 711 of the PTS terminal 700 which has received the content. For example, all banknotes of USD (US dollar), JPY (Japanese yen), CNY (yuan), and HKD (Hong Kong Dollar) which are not selected on the offline-available money type selection screen 511 of FIG. 11 are set to be unavailable, and thus are set to be unavailable in the offline state in the currency reading device 201 of the slot machine 4S. Meanwhile, all banknotes of a local currency (PHP, peso) which are selected on the offline-available money type selection screen 511 are set to be available even in the offline state in the currency reading device 201 of the slot machine 4S. In the present embodiment, all banknotes of a local currency (PHP, peso) which is not affected by the variation of the exchange rate are selected, and thus are set to be available even in the offline state in each slot machine 4S. Then, this process is terminated.

Regarding the content of the settings for offline-available currencies which has been input in the step S101, it is possible to perform the limit of usage of only a predetermined money type of a predetermined currency in this available currency settings updating process. For example, assume that a $1000 banknote and a $500 banknote and a $200 banknote and a $100 banknote and a $50 banknote and a $20 banknote of PHP (peso), a $50 banknote and a $20 banknote and a $10 banknote of USD (US dollar), a \5000 banknote and a \1000 banknote of JPY (Japanese yen), a \50 banknote and a \20 banknote and a \10 banknote of CNY (yuan), and a $100 banknote and a $50 banknote and a $20 banknote and a $10 banknote of HKD (Hong Kong dollar) are selected on the offline-available money type selection screen 511. In this case, these banknotes are set to be available even in the offline state. Meanwhile, a $100 banknote of USD (US dollar), a \10000 banknote of JPY (Japanese yen), a \100 banknote of CNY (yuan), and a $500 banknote of HKD (Hong Kong dollar) are not selected, and thus are set to be unavailable in the offline state.

When the settings for offline-available currencies are updated in the PTS terminal 700 in the step S103, information of the settings for offline-available currencies is displayable on the LCD of the PTS terminal 700 or on a display device of the slot machine 4S.

(Banknote Receiving Process)

Figure 6:
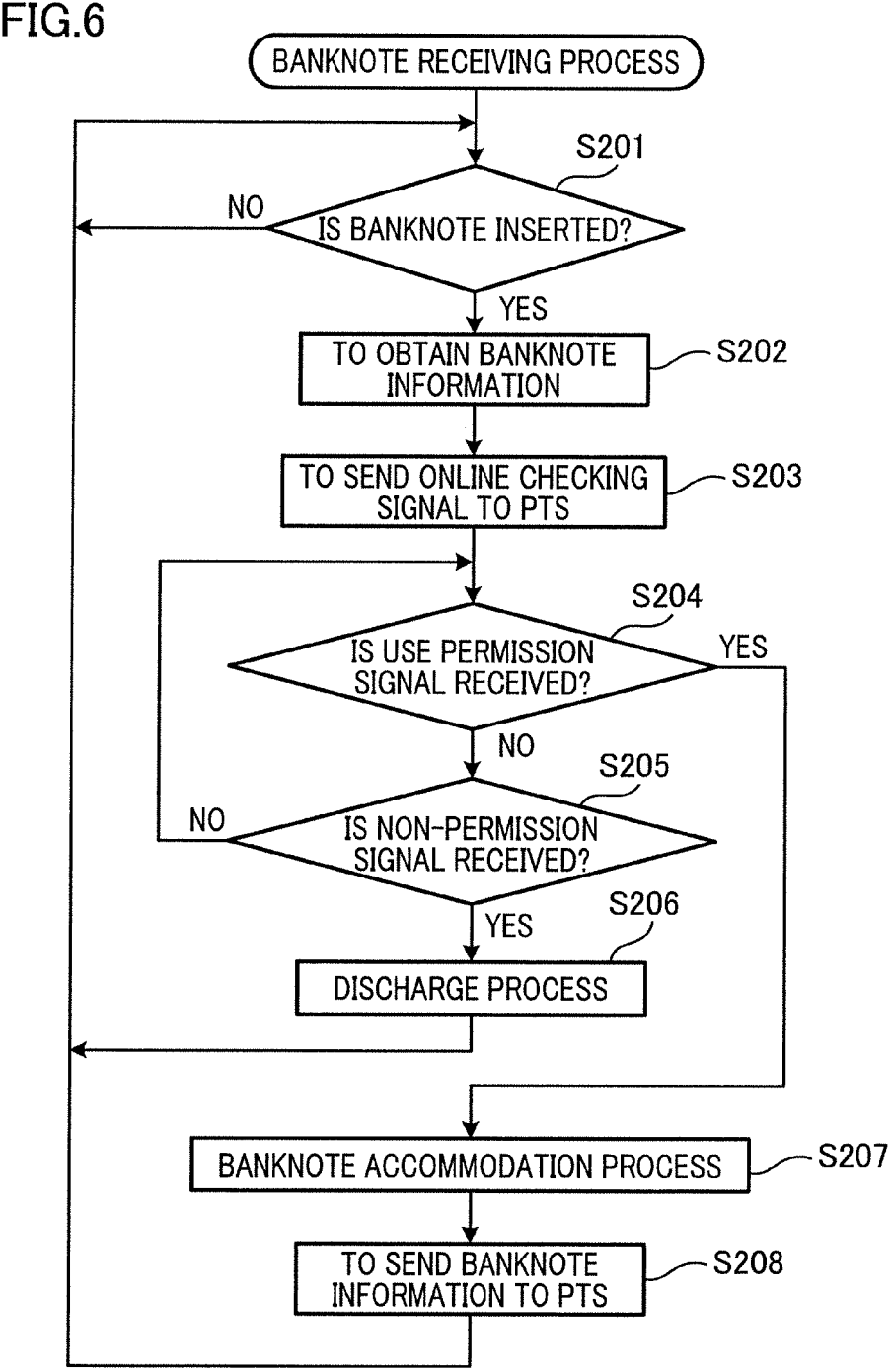
FIG. 6 is a flowchart of a banknote receiving process.

The following will describe a banknote receiving process which is performed by a CPU 210 of a control circuit board 200A when a currency reading device 201 mounted at a slot machine 4S receives a banknote T from a bill entry 22, with reference to a flowchart of FIG. 6. In the slot machine 4S, the settings for offline-available currencies are updated in the available currency management process described above.

To begin with, the CPU 210 determines whether a valid banknote T is inserted from the bill entry 22 (S201). If a valid banknote T has not been inserted (NO in S201), the invalid banknote T is discharged. Then, the CPU 210 performs the step S201 again and waits for the insertion of a valid banknote T.

Meanwhile, if a valid banknote T has been inserted (YES in S201), the CPU 210 obtains banknote information of the inserted banknote T based on a signal from the banknote reading sensor 8 (S202). To be more specific, the followings are obtained as the banknote information: a kind of the inserted banknote T (currency such as PHP, peso; USD, US dollar; JPY, Japanese Yen; CNY, yuan; HKD, Hong Kong dollar; EUR, euro; MOP, Macanese pataca; AUD, Australian dollar); and a money type of the inserted banknote T (e.g., monetary amount such as $100 banknote, $50 banknote, $20 banknote, and $10 banknote, etc., in USD; US dollar).

Subsequently, the CPU 210 sends an online checking signal and the banknote information which has been acquired in the step S202 to a PTS terminal 700 (S203). The online checking signal is used for checking whether the slot machine management server 1 or casino management system 2 and the slot machine 4S (PTS terminal 700) are currently in the online state in which communication is enabled.

Assume that the PTS terminal 700 receives an online checking signal. In this case, when it is determined that the slot machine management server 1 or casino management system 2 and the PTS terminal 700 are currently in the online state in which communication is enabled or when the inserted banknote T is determined as one of the offline-available currencies based on the banknote information which has been acquired in the step S202 in the PTS terminal 700, a use permission signal is sent to the PTS terminal 700 in return. The details are described later. Meanwhile, when it is determined that the slot machine management server 1 or casino management system 2 and the PTS terminal 700 are currently in the offline state and cannot communicate with each other and it is determined that the inserted banknote T is not one of the offline-available currencies based on the banknote information which has been acquired in the step 202, the PTS terminal 700 sends a non-permission signal to the PTS terminal 700 in return.

Subsequently, the CPU 210 determines whether a use permission signal sent from the PTS terminal 700 is received (S204). If a use permission signal has not been received (NO in S204), the CPU 210 determines whether a non-permission signal sent from the PTS terminal 700 is received (S205). In addition to that, if a non-permission signal has not been received (NO in S205), the step S204 is performed again.

Meanwhile, if a non-permission signal has been received (YES in S205), the inserted banknote T is discharged from the bill entry 22 (S206: discharge process). In other words, when it is determined that the slot machine management server 1 or casino management system 2 and the PTS terminal 700 are in the offline state and cannot communicate with each other and it is determined that a banknote of one of unavailable foreign currencies which have not been selected on the offline-available money type selection screen 511 of FIG. 11, i.e., one of banknotes of USD (US dollar), JPY (Japanese yen), CNY (yuan), and HKD (Hong Kong dollar) is inserted, the inserted banknote is determined as a currency unavailable in the offline state and the inserted banknote, i.e., every inserted banknote of USD (US dollar), JPY (Japanese yen), CNY (yuan), and HKD (Hong Kong dollar) is discharged from the bill entry 22. Because of this, the usage of every foreign currency set as a currency unavailable in the offline state is limited (stopped) in such a way that an unavailable foreign currency is discharged even if it is inserted from the bill entry 22. Then, after the discharge process of S206, the routine goes back to S201.

If the use permission signal has been received in the step S204 (YES in S204), the CPU 210 conveys the inserted banknote T to a banknote accommodation unit 202 and stores the inserted banknote T (S207). For example, when all banknotes of a local currency (PHP, peso) have been selected and set as money types of the offline-available currency on the offline-available money type selection screen 511 of FIG. 11, every inserted banknote of a local currency (PHP, peso) is determined as one of money types of the offline-available currency, and the inserted banknote of a local currency (PHP, peso) is conveyed to the banknote accommodation unit 202 and then stored.

Subsequently, the CPU 210 sends the banknote information which has been obtained in the step S202 to the PTS terminal 700 (S208).

By the above-described structure, when a communication error occurs between a currency handling system 100 (currency reading device 201 and PTS terminal 700) and the slot machine management server 1 or casino management system 2, a process which limits the usage of a foreign currency (e.g., USD; dollar) but allows the usage of a local currency (PHP, peso) is performed in the currency reading device 201. Because of this, when the casino management system 2 is in the offline state so as to be unable to manage and monitor a foreign currency, a risk of dealing with a foreign currency at a time of a communication error is decreased by limiting the usage of a foreign currency (USD, dollar) and not limiting the usage of a local currency (PHP, peso).

(Online Checking Process)

Figure 7:
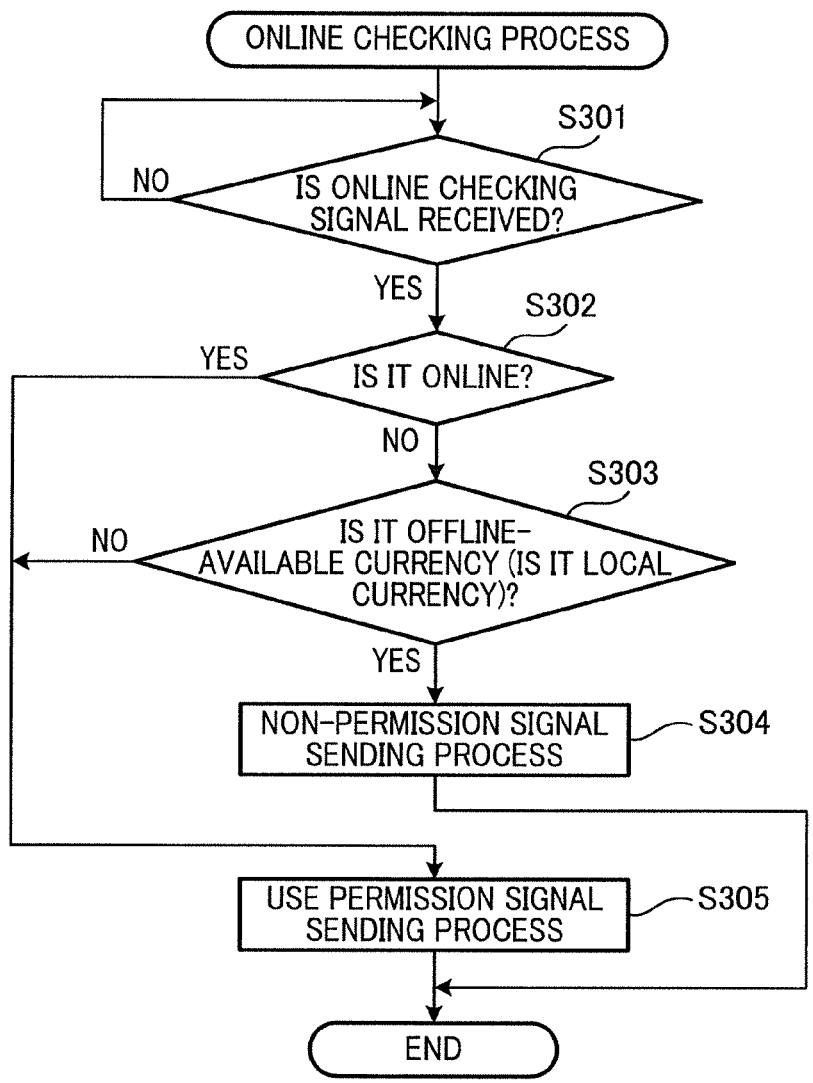
FIG. 7 is a flowchart of an online checking process.

An online checking process will be described with a flowchart of FIG. 7. The online checking process is performed by a smart interface board 710 of the PTS terminal 700 when the PTS terminal 700 receives the online checking signal which has been sent from the currency reading device 201 in the step 203 of the above-described banknote receiving process.

To begin with, the smart interface board 710 determines whether the online checking signal which has been sent from the currency reading device 201 in the step S203 of the above-described banknote receiving process is received (S301). If the online checking signal has not been received (NO in S301), supply of the signal is waited.

Meanwhile, if the online checking signal has been received (YES in S301), the smart interface board 710 determines whether the slot machine management server 1 or casino management system 2 and the PTS terminal 700 are currently in the online state in which communication is enabled (S302). Subsequently, if it has been determined that they are in the online state (YES in S302), the smart interface board 710 sends a use permission signal to the currency reading device 201 (S305). Then, this process ends.

Meanwhile, if it is determined that they are not in the online state (i.e., if it has been determined that they are in the offline state; No in S302), the smart interface board 710 determines whether the content of the banknote information which has been acquired in the step S202 is one of the offline-available currencies based on the content which has been updated in the available currency settings updating process of S103 (S303).

Then, if it is determined that the content of the banknote information which has been acquired in the step S202 is not one of the offline-available currencies (NO in S303), the smart interface board 710 sends a non-permission signal to the currency reading device 201 (S304). For example, when the content of the banknote information which has been acquired in the step 202 is a banknote of one of the unavailable currencies which have not been selected on the offline-available money type selection screen 511 of FIG. 11, i.e., is one of banknotes of USD (US dollar), JPY (Japanese yen), CNY (yuan), and HKD (Hong Kong Dollar), etc., the inserted banknote is determined as a currency unavailable in the offline state and a non-permission signal is sent to the currency reading device 201. This process is terminated in the step 304.

Meanwhile, if the content of the banknote information which has been acquired in the step S202 has been determined as one of the offline-available currencies (YES in S303), the smart interface board 710 sends a use permission signal to the currency reading device 201 (S305). For example, when the content of the banknote information which has been acquired in the step 202 is a local currency (PHP, peso) which has been selected to be available on the offline-available money type selection screen 511 of FIG. 11, the inserted banknote is determined as a currency available in the offline state and a use permission signal is sent to the currency reading device 201. This process is terminated by the step 305.

(Banknote Information Receiving Process)

Figure 8:
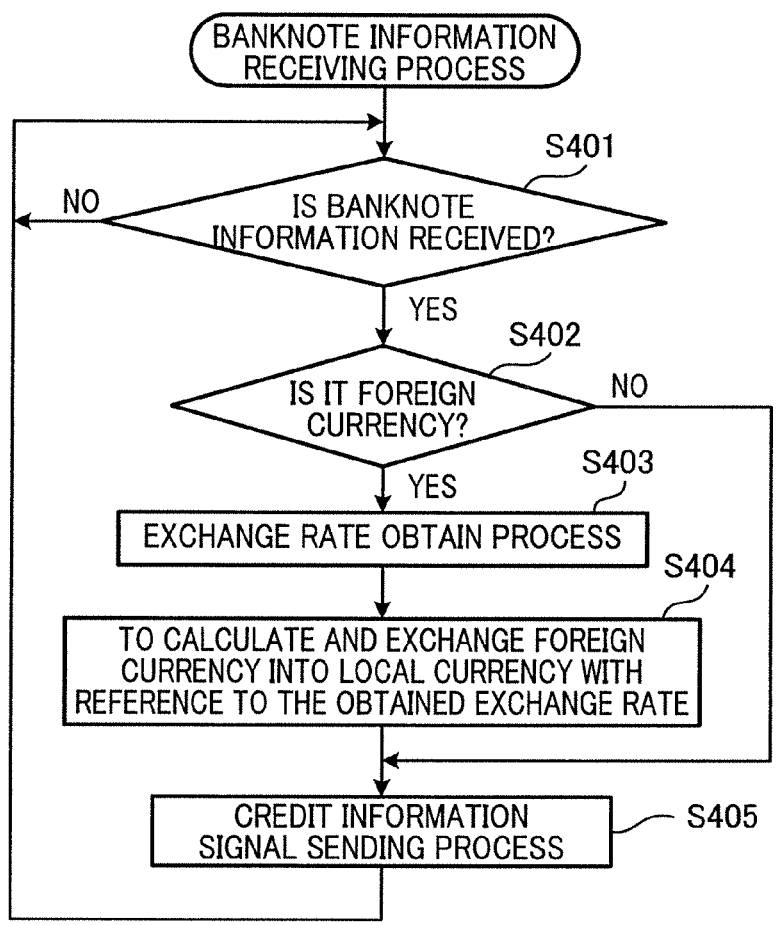
FIG. 8 is a flowchart of a banknote information receiving process.

A banknote information receiving process will be described with reference to a flowchart of FIG. 8. The banknote information receiving process is performed by the smart interface board 710 when the PTS terminal 700 receives the banknote information which has been sent from the currency reading device 201 in the step S208 of the banknote receiving process described above.

To begin with, the smart interface board 710 determines whether the banknote information which has been sent from the currency reading device 201 is received (S401). If the banknote information has not been received (NO in S401), supply of the banknote information is waited.

Meanwhile, if the banknote information has been received (YES in S401), the smart interface board 710 determines whether a kind of a banknote T which is read from the banknote information is a foreign currency, i.e., whether it is one of currencies except PHP (peso) of a local currency (S402). In the present embodiment, USD (US dollar), JPY (Japanese yen), CNY (yuan), and HKD (Hong Kong dollar), etc., are foreign currencies.

If information indicating the kind of the banknote T which is read from the banknote information has been determined as one of foreign currencies (YES in S402), the smart interface board 710 performs an exchange rate obtain process (S403). In this exchange rate obtain process, the casino management system 2 is accessed (asked) through the slot machine management server 1 from the PTS terminal 700, and an exchange rate is obtained. The exchange rate is stored in the storage unit 402 of the casino management system 2, and corresponds to the foreign currency which is the type read from the banknote information. For example, when the foreign currency which is the type read from the banknote information is US dollar, an exchange rate is obtained. The exchange rate ("USD/PHP") regulates an exchange ratio which is used for exchanging US dollar of a foreign currency into PHP (peso) of a local currency. In this regard, the obtained exchange rate is stored in the storage unit 711.

Subsequently, the smart interface board 710 calculates and exchanges (replaces) a money type (monetary amount) of the foreign currency into a monetary amount of a local currency (PHP, peso) with reference to the exchange rate which has been obtained in the step S403 (S404). In this regard, the foreign currency is the type read from the banknote information. When it is currently in the offline state, information indicating a kind of the banknote T which is read from the banknote information is a foreign currency, and the currency is set as one of the offline-available currencies, the exchange rate currently stored in the storage unit 711 is referred to, without accessing the casino management system 2 (because it is unable to access the system because of the offline state).

In this step, the exchange rate of a currency of each country which is stored in the storage unit 402 of the casino management system 2 is an exchange ratio from a foreign currency which is available in the gaming machine 4 (e.g., slot machine 4S which is managed by the slot machine management server 1, and baccarat game table 4B and roulette game table 4R which are managed by the table game management server 1A) provided in the gaming facility 15 to a local currency (PHP, peso), and is updated by manual input from the input unit 404 at every predetermined time. The manual input is made by the person in charge of the casino management system 2 who has obtained information of the exchange rate from the outside. In the present embodiment, at every predetermined time (e.g., AM 6:00), the person in charge of the casino management system 2 grasps the latest information of the exchange rate of each foreign currency and manually updates the exchange rate of a currency of each country which is stored in the storage unit 402. In this regard, the update of the exchange rate may be performed at a wide variety of timing in accordance with a kind of the currency. In the present embodiment, the update of the exchange rate in the casino management system 2 is manually performed. Alternatively, the exchange rate in the casino management system 2 may be automatically updated by automatically obtaining exchange rates from the outside. Alternatively, instead of the predetermined time, the exchange rate may be adjusted to an exchange rate which varies in real time. Information of the exchange rate is sent to a PTS terminal 700 of each slot machine 4S through the slot machine management server 1. Because of this, a PTS terminal 700 which has obtained the exchange rate is able to display a current exchange rate of a currency of each country onto an LCD.

In the step S404, for example, when an exchange rate "USD/PHP" obtained from the casino management system 2 is "53.100" (one US dollar is exchanged into 53.100 pesos) and a money type (monetary amount) of a foreign currency is a $10 banknote of USD, it is calculated and exchanged into 531 pesos of a local currency. In this regard, the foreign currency is the type read from the banknote information.

Meanwhile, if it is determined that the kind of the banknote T which has been read from the banknote information in the step S402 is not one of foreign currencies (i.e., determined as PHP, peso, of local currency; NO in S402), or after the step S404, the smart interface board 710 performs a credit information signal sending process (S405). In this credit information signal sending process, when the kind of the banknote T which has been read from the banknote information in the step S402 is PHP (peso) of a local currency, a monetary amount of the money type is sent to the slot machine controller 300 as a credit information signal. For example, when the kind of the banknote T which has been read from the banknote information in the step S402 is 500 pesos of a local currency, the 500 pesos are sent to the slot machine controller 300 as a credit information signal. When a foreign currency has been calculated and exchanged into a local currency, i.e., into PHP (peso) in the step S404, the exchanged monetary amount of the local currency is sent to the slot machine controller 300 as a credit information signal. For example, when a $10 banknote of USD has been calculated and exchanged into 531 pesos of a local currency in the step S404, the 531 pesos are sent to the slot machine controller 300 as a credit information signal. After that, the step S401 is performed again.

(Slot Game Running Process)

Figure 9:
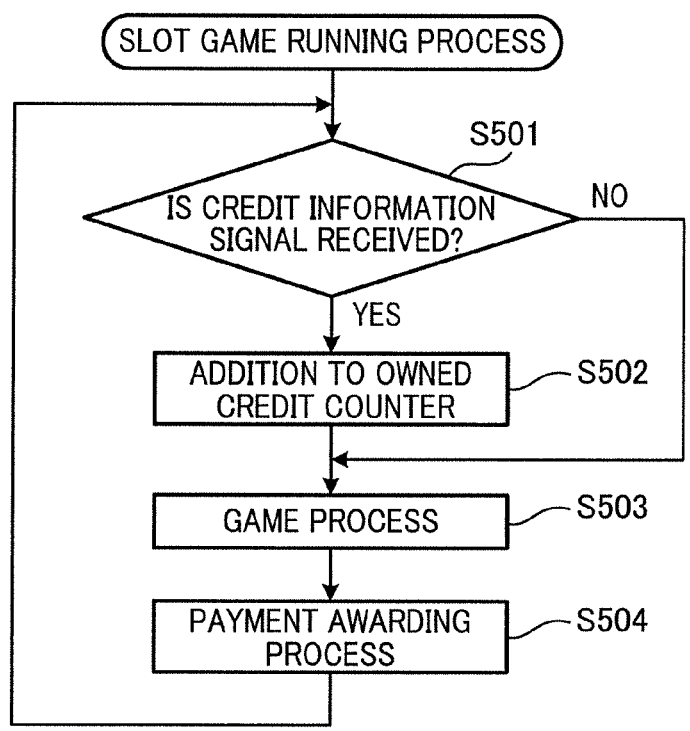
FIG. 9 is a flowchart of a slot game running process.

A flowchart of a slot game running process will be described with reference to FIG. 9. The slot game running process is performed by the game controller 302 of the slot machine controller 300 of the slot machine 4S.

To begin with, the game controller 302 determines whether a credit information signal is received from the PTS terminal 700 (S501). If a credit information signal has been received (YES in S501), the game controller 302 adds a monetary amount (PHP, peso, of local currency) based on the credit information signal to an owned credit counter of a RAM (S502). The owned credit counter of the RAM shows a monetary amount which is owned by a player.

After the step S502, or if a credit information signal has not been received (NO in S501), the game controller 302 performs a game process (S503). In this game process, a slot game is performed by a player. The slot game awards a payout based on a betted monetary amount (amount which is betted from the owned credit counter) and a game result. In this slot game, twenty symbols randomly determined are displayed on a symbol display area which is formed of twenty areas forming a matrix with, e.g., five columns and four rows. In addition to that, a payout is awarded based on a displayed symbol combination (game result) and a betted monetary amount.

The awarded payout is added to the owned credit counter (S504). In this regard, e.g., information based on a game result is sent to the slot machine management server 1 through the PTS terminal 700, and managed in the slot machine management server 1.

(Exchange Rate Updating Process)

Figure 10:
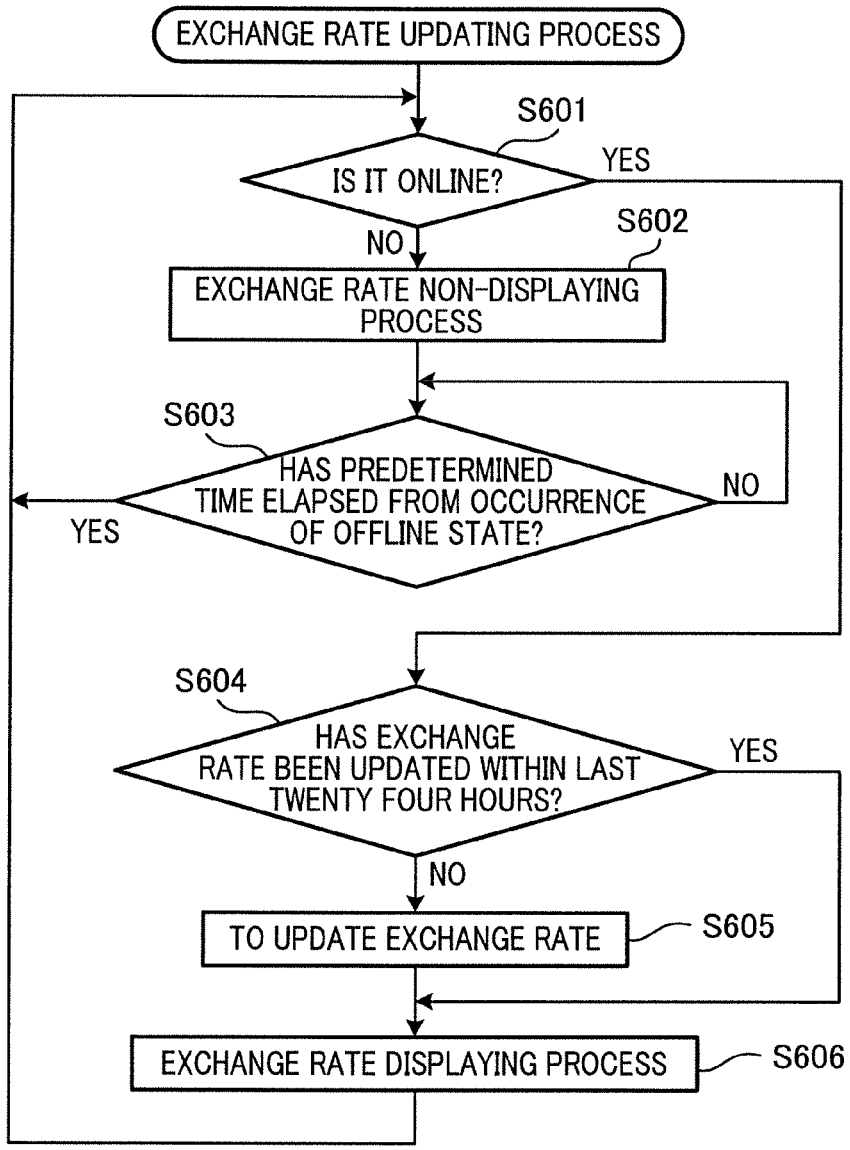
FIG. 10 is a flowchart of an exchange rate updating process.

An exchange rate updating process will be described with reference to FIG. 10. The exchange rate updating process is performed in the PTS terminal 700 in order to display the current exchange rate of a currency of each country onto an LCD of the PTS terminal 700, at the time of the update of the exchange rate stored in the storage unit 711.

To begin with, the smart interface board 710 determines whether the casino management system 2 and the PTS terminal 700 are in the online state in which communication is enabled (S601). If it is determined that they are not in the online state (NO in S601), that is, they are in the offline state, the smart interface board 710 performs an exchange rate non-displaying process (S602). In this exchange rate non-displaying process, the current exchange rate of a currency of each country which is displayed on the LCD is hidden. For example, when the exchange rate is currently displayed, the exchange rate is hidden. For another example, in a case in which the exchange rate is not currently displayed, a message is displayed. The message indicates that the exchange rate is currently unable to be displayed.

Subsequently, the smart interface board 710 determines whether a predetermined time (one minute in the present embodiment) elapses since the occurrence of the offline state (S603). If the predetermined time has not elapsed since the occurrence of the offline state (NO in S603), the process is on standby until the elapse of the predetermined time from the occurrence of the offline state. Meanwhile, if the predetermined time has elapsed since the occurrence of the offline state (YES in S603), the step S601 is performed again.

If it has been determined that the online state has occurred in the step S601 (YES in S601), the smart interface board 710 determines whether the exchange rate stored in the storage unit 711 is updated within the last twenty four hours (S604). If the exchange rate stored in the storage unit 711 has not been updated within the last twenty four hours (NO in S604), the smart interface board 710 accesses the casino management system 2, acquires information of the latest exchange rate, and then updates the exchange rate stored in the storage unit 711 to the latest exchange rate (S605). In this regard, the update of the exchange rate is performed at a variety of timing in accordance with a kind of currency. Alternatively, the exchange rate may be adjusted to an exchange rate which moves in real time.

Meanwhile, if the exchange rate stored in the storage unit 711 has been updated within the last twenty four hours in the step S604 (YES in S604), or after the step S605, the smart interface board 710 performs an exchange rate displaying process (S606). In this exchange rate displaying process, the exchange rate stored in the storage unit 711 is referred, and the current exchange rate of a currency of each country is able to be displayed on the LCD. For example, when the exchange rate is hidden, the exchange rate or a message is displayed. The message indicates that the exchange rate is currently displayable. After the step S606, the routine goes back to the step S601.

By the above-described structure, when information of the exchange rate is not acquirable because of a communication error between the currency handling system 100 (currency reading device 201 and PTS terminal 700) and the slot machine management server 1 or casino management system 2, a process which limits (hides) the display of the exchange rate on the LCD of the PTS terminal 700 is performed. Because of this, when the offline state occurs so that the casino management system 2 is unable to manage and monitor the exchange rate of each foreign currency, it is possible to inform that the usage of each foreign currency is limited.

When the communication error is recovered (the online state occurs after the offline state) after a communication error occurs between the currency handling system 100 (currency reading device 201 and PTS terminal 700) and the slot machine management server 1 or casino management system 2, the exchange rate in the storage unit 711 is updated. Because of this, when the online state occurs again after the occurrence of the offline state in which the exchange rate of each foreign currency is unable to be managed and monitored in the casino management system 2, the exchange rate which is necessary to use (exchange) each foreign currency is immediately updated. As a result, it is possible to immediately inform that the limit of the usage of each foreign currency is removed.

Other Embodiments

In the present embodiment described above, the currency reading device 201 is embedded in the gaming machine 4 such as the slot machine 4S. However, the disclosure is not limited to this. The currency reading device 201 may be a terminal device connected to an external apparatus such as a money exchanger, a vending machine, and a ticket machine. Alternatively, the currency reading device 201 may not be embedded in such a terminal device. While in the present embodiment the currency reading device 201 is provided for each gaming machine 4, one currency reading device 201 may be provided for plural gaming machines 4.

In the present embodiment described above, the exchange rate is managed in the casino management system 2. Alternatively, the exchange rate may be managed in the slot machine management server 1, and a role of exchanging a foreign currency into a local currency may be played by the slot machine management server 1 or casino management system 2.

The slot machine management server 1 and the casino management system 2 play a role of the management server of the present invention. Alternatively, one server may play a role of the management server of the present invention.

Embodiments of the present invention thus described above solely serve as specific examples of the present invention, and are not to limit the scope of the present invention. The specific structures and the like are suitably modifiable. Further, the effects described in the embodiment of the present invention described in the above embodiment are no more than examples of preferable effects brought about by the present invention, and the effects of the present invention are not limited to those described hereinabove.

REFERENCE SIGNS LIST

1 management server
2 casino management system
3 network
4 gaming machine
4S slot machine
100 currency handling system
101 center controller
102 storage unit
103 communication interface
104 input unit
105 display unit
201 currency reading device
210 CPU
214 RAM
300 slot machine controller
700 PTS terminal
710 smart interface board
711 storage unit
T banknote

The invention claimed is:
1. A currency handling system comprising:
a currency reading device including:
an insertion slot capable of receiving a banknote of a local currency and of a foreign currency, and one or more of a card, or a ticket;
a conveyance mechanism that transports the received banknote, card, or ticket;
a reading sensor that reads the received banknote, card, or ticket conveyed by the conveyance mechanism; and,
an accommodation unit, that stores a validated banknote conveyed by the conveyance mechanism; and,
a first central processing unit in communication with a first computer readable memory storing banknote reference data, the first central processing unit is programmed to determine whether the received banknote is valid, and whether the received banknote is of the local currency or of a foreign currency, and
a management server including a second central processing unit and a second computer readable memory,
the first central processing unit is further programmed to:
determine that a received banknote is valid;
transmit a checking signal from the currency reading device to the management server;
determine whether a communication error exists between the currency reading device and the management server;
wherein, when the first central processing unit determines that a communication error exists between the currency reading device and the management server, and the received and validated banknote is of a first foreign currency, the first central processing unit is further programmed to discharge the received and validated banknote of the first foreign currency from the currency reading device;
wherein, when the first central processing unit determines that a communication error exists between the currency reading device and the management server, and the received and validated banknote is of a second foreign currency, the first central processing unit is further programmed to convey the received and validated banknote of the second foreign currency to the accommodation unit;
wherein, when the first central processing unit determines that a communication error exists between the currency reading device and the management server, and the received and validated banknote is of the local currency, the first central processing unit is further programmed to convey the received and validated banknote of the local currency to the accommodation unit; and,
wherein, when the first central processing unit determines that a communication error does not exist between the currency reading device and the management server, and the received and validated banknote is one of the first foreign currency or the second foreign currency, the first central processing unit is further programmed to convey the received and validated banknote of the one of the first foreign currency or the second foreign currency to the accommodation unit.

2. The currency handling system according to claim 1, further comprising:
a player tracking system (PTS) including:
a third central processing unit;
a third computer readable memory that receives and stores exchange rate data received from the management server; and,
a display device that displays the exchange rate data, wherein, the third central processing unit is programmed to perform processes of:
(a) updating the exchange rate data stored in the third computer readable memory when the exchange rate data is received from the management server;
(b) referring to the exchange rate data stored in the third computer readable memory and displaying the exchange rate data on the display unit; and
(c) limiting display of the exchange rate data on the display unit when a communication error occurs between one or more of the management server, the player tracking system (PTS), and the currency reading device.

3. The currency handling system according to claim 2, wherein,
when a communication error occurs between one or more of the management server, the player tracking system (PTS), and the currency reading device, and the communication error is subsequently rectified, upon the communication error being rectified the third central processing unit is further programmed to communicate with the management server to cause the management server to execute a process of updating the exchange rate data stored in the third computer readable memory.

4. The currency handling system according to claim 3, wherein, the third central processing unit is programmed to perform processes of:

limiting usage of a predetermined money type of a predetermined foreign currency in the currency reading device in a case in which an error occurs in communication with the management server.

5. The currency handling system of claim 2, wherein when the first central processing unit determines that a communication error exists between the currency reading device and the management server, and the received and validated banknote is of the first foreign currency, the first central processing unit is further programmed to only discharge the received and validated banknote of the first foreign currency from the currency reading device when the exchange rate data stored in the third computer readable memory has not been updated after a predetermined time.

6. A currency handling system comprising:
a currency reading device including:
an insertion slot capable of receiving a banknote of a local currency and of a foreign currency, and one or more of a card, or a ticket;
a conveyance mechanism that transports the received banknote, card, or ticket;
a reading sensor that reads the received banknote, card, or ticket conveyed by the conveyance mechanism; and,
an accommodation unit, that stores a validated banknote conveyed by the conveyance mechanism; and,
a first central processing unit in communication with a first computer readable memory storing banknote, card, and ticket reference data, the first central processing unit is programmed to determine whether the received banknote, card, or ticket is valid, and whether the received banknote, card, or ticket includes an amount denominated in the local currency or of a foreign currency, and
a management server including a second central processing unit and a second computer readable memory,
the first central processing unit is further programmed to:
determine that a received banknote, card, or ticket is valid;
transmit a checking signal from the currency reading device to the management server;
determine whether a communication error exists between the currency reading device and the management server;
wherein, when the first central processing unit determines that a communication error exists between the currency reading device and the management server, and the received and validated banknote, card, or ticket includes an amount denominated in a first foreign currency, the first central processing unit is further programmed to discharge the received and validated banknote, card, or ticket of the first foreign currency from the currency reading device;
wherein, when the first central processing unit determines that a communication error exists between the currency reading device and the management server, and the received and validated banknote, card, or ticket includes an amount denominated in a second foreign currency, the first central processing unit is further programmed to retain the received and validated banknote, card, or ticket in the currency reading device and/or convey the received and validated banknote, card, or ticket to the accommodation unit;
wherein, when the first central processing unit determines that a communication error exists between the currency reading device and the management server, and the received and validated banknote, card, or ticket includes an amount denominated in the local currency, the first central processing unit is further programmed to retain the received and validated banknote, card, or ticket in the currency reading device and/or convey the received and validated banknote, card, or ticket to the accommodation unit; and,
wherein, when the first central processing unit determines that a communication error does not exist between the currency reading device and the management server, and the received and validated banknote, card, or ticket includes an amount denominated in the first foreign currency or the second foreign currency, the first central processing unit is further programmed to retain the received and validated banknote, card, or ticket in the currency reading device and/or convey the received and validated banknote, card, or ticket to the accommodation unit.

* * * * *